United States Patent
Ihara et al.

(10) Patent No.: US 6,925,509 B2
(45) Date of Patent: Aug. 2, 2005

(54) OUTPUTTING A PACKET OF CHARACTER DATA INFORMATION OF AN ELECTRONIC PROGRAM GUIDE COMPLIANT WITH IEEE 1394 STANDARD TO A PRINTER INDEPENDENT OF A VECTOR FONT

(75) Inventors: Yushi Ihara, Kanagawa (JP); Yoshio Kitamura, Kanagawa (JP); Toshio Narushima, Kanagawa (JP); Makoto Niioka, Tokyo (JP); Yuji Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 09/778,341

(22) Filed: Feb. 7, 2001

(65) Prior Publication Data

US 2002/0051160 A1 May 2, 2002

(30) Foreign Application Priority Data

Feb. 8, 2000 (JP) ........................................ 2000-030193

(51) Int. Cl.$^7$ .............................. H04N 5/76; H04N 7/025
(52) U.S. Cl. ........................... 710/62; 710/72; 358/1.15; 725/39; 725/55
(58) Field of Search .............................. 710/62, 72, 5, 710/100, 30; 358/1.15; 725/39, 55, 56

(56) References Cited

U.S. PATENT DOCUMENTS 6,205,485 B1 * 3/2001 Kikinis ........................ 709/231
6,603,737 B1 * 8/2003 Fukunaga et al. ........... 370/229
2004/0168187 A1 * 8/2004 Chang ......................... 725/40

FOREIGN PATENT DOCUMENTS

JP            409219842       * 8/1997

* cited by examiner

Primary Examiner—Ilwoo Park
(74) Attorney, Agent, or Firm—Frommer Lawrence & Haug LLP; William S. Frommer; Thomas F. Presson

(57) ABSTRACT

The present invention relates to an image printing apparatus for printing character data information of an electronic program guide added to externally inputted image information, comprising: an information processor comprising: demodulating/decoding means for detecting and demodulating/decoding the character data information of the electronic program guide added to the externally inputted image information; storage means for storing the demodulated/decoded character data information of the electronic program guide by the demodulating/decoding means; and output means for including the character data information of the electronic program guide stored by the storage means into a packet compliant with the IEEE 1394 standard and outputting the packet to the printer, and a printer comprising: input means for inputting the character data information of the electronic program guide included in the packet compliant with the IEEE 1394 standard outputted from the output means; print control means for detecting print control information from the character data information of the electronic program guide supplied from the input means; and printing means for printing the character data information of the electronic program guide under the control of the print control means.

3 Claims, 7 Drawing Sheets

FIG. 6

| Address Offset | msb | | | | | | lsb |
|---|---|---|---|---|---|---|---|
| 00 00₁₆ | Service_number | | | | | | |
| 00 01₁₆ | | | | | | | |
| 00 02₁₆ | Service_name | | | | | | |
| .. | | | | | | | |
| 00 29₁₆ | | | | | | | |
| 00 2A₁₆ | logo_type | | | | logo_color_cb0 | | |
| 00 2B₁₆ | logo_color_y0 | | | | | logo_color_y1 | |
| 00 2C₁₆ | logo_color_cr0 | | | | | logo_color_cr1 | |
| 00 2D₁₆ | logo_color_cb1 | | | | | | |
| 00 2E₁₆ | logo_bit_map | | | | | | |
| .. | | | | | | | |
| 01 71₁₆ | | | | | | | |

FIG.7

OUTPUTTING A PACKET OF CHARACTER DATA INFORMATION OF AN ELECTRONIC PROGRAM GUIDE COMPLIANT WITH IEEE 1394 STANDARD TO A PRINTER INDEPENDENT OF A VECTOR FONT

BACKGROUND OF THE INVENTION

The present invention relates generally to an image printing apparatus for printing images received by a receiving apparatus via an interface compliant with the IEEE (Institute of Electrical and Electronics Engineers) 1394 standard for example and, more particularly, to an image printing apparatus capable of printing an electronic program guide contained in received formation.

The IEEE 1394 standard defines the physical and electrical standards of connectors for interconnecting various devices. The devices equipped with IEEE 1394 compliant interfaces are physically interconnected to realize so-called Hot Plug and Play functionality which supports the high-speed digital data transfer between these devices and the automatic setting of connections therebetween. The IEEE 1394 standard, currently widespread as a de facto standard serial interface, has capabilities of preferentially transferring data which must be transferred in constant timed relations, making the standard suitable for the handling of multimedia data.

For the distribution of images and music by use of the Internet or satellite broadcasting for example, it is desired to add these images and music with associated text data, program guides for example, as character screens.

The equipment for use in the distribution of sounds and moving images for example includes STBs (Set Top Boxes), which is a device for connecting a commercially available television receiver with a CATV or the antenna for receiving satellite broadcast, television receivers, and printers.

With related-art printers which print NTSC-size television screens, as they are, displayed by an STB or a television receiver, however, because television screen is significant inferior in resolution than print, the related-art printers cannot print television screens as clearly and legibly as print.

Some related-art printers compliant with the IEEE 1394 standard provide a method of printing television screens by preparing vector fonts on the STB or television receiver side, developing character images for print, and executing color segmentation and other necessary processing to print television screens. However, this method requires having, on the STB or television receiver side, a buffer memory in which a print character image is developed, which increases the load on the STB or television receiver side, requiring additional resources accordingly.

SUMMARY OF THE INVENTION

As described, some related-art image printers can print television screens as still images. However, the images, especially the character thus printed are not enough in resolution for ease of reading. In addition, the provision of vector fonts on the STB or television receiver side increases the equipment cost.

It is therefore an object of the present invention to provide an image printing apparatus which solves these problems with a comparatively easy method in which character data of program guides for example received by the STB can be printed with a legible-enough resolution without arranging vector fonts and a buffer memory therefor.

In carrying out the invention and according to one aspect thereof, there is provided an image printing apparatus for printing character data information of an electronic program guide added to externally inputted image information, comprising: an information processor comprising: demodulating/decoding means for detecting and demodulating/decoding the character data information of the electronic program guide added to the externally inputted image information; storage means for storing the demodulated/decoded character data information of the electronic program guide by the demodulating/decoding means; and output means for including the character data information of the electronic program guide stored by the storage means into a packet compliant with the IEEE 1394 standard and outputting the packet to the printer, and a printer comprising: input means for inputting the character data information of the electronic program guide included in the packet compliant with the IEEE 1394 standard outputted from the output means; print control means for detecting print control information from the character data information of the electronic program guide supplied from the input means; and printing means for printing the character data information of the electronic program guide under the control of the print control means.

Consequently, the externally supplied character data such as program guides can be printed with a resolution good enough for reading the printed characters without especially arranging vector fonts and a buffer memory for storing them.

BRIEF DESCRIPTION OF THE DRAWINGS

These and other objects of the invention will be seen by reference to the description, taken in connection with the accompanying drawing, in which:

FIG. 6 is a diagram illustrating a format of CH data; and

FIG. 7 is a diagram illustrating one example of a print obtained by laying out EPG data and CH data by the invention.

DETAILED DESCRIPTION OF PREFERRED EMBODIMENTS

This invention will be described in further detail by way of example with reference to the accompanying drawings.

Figure 1:
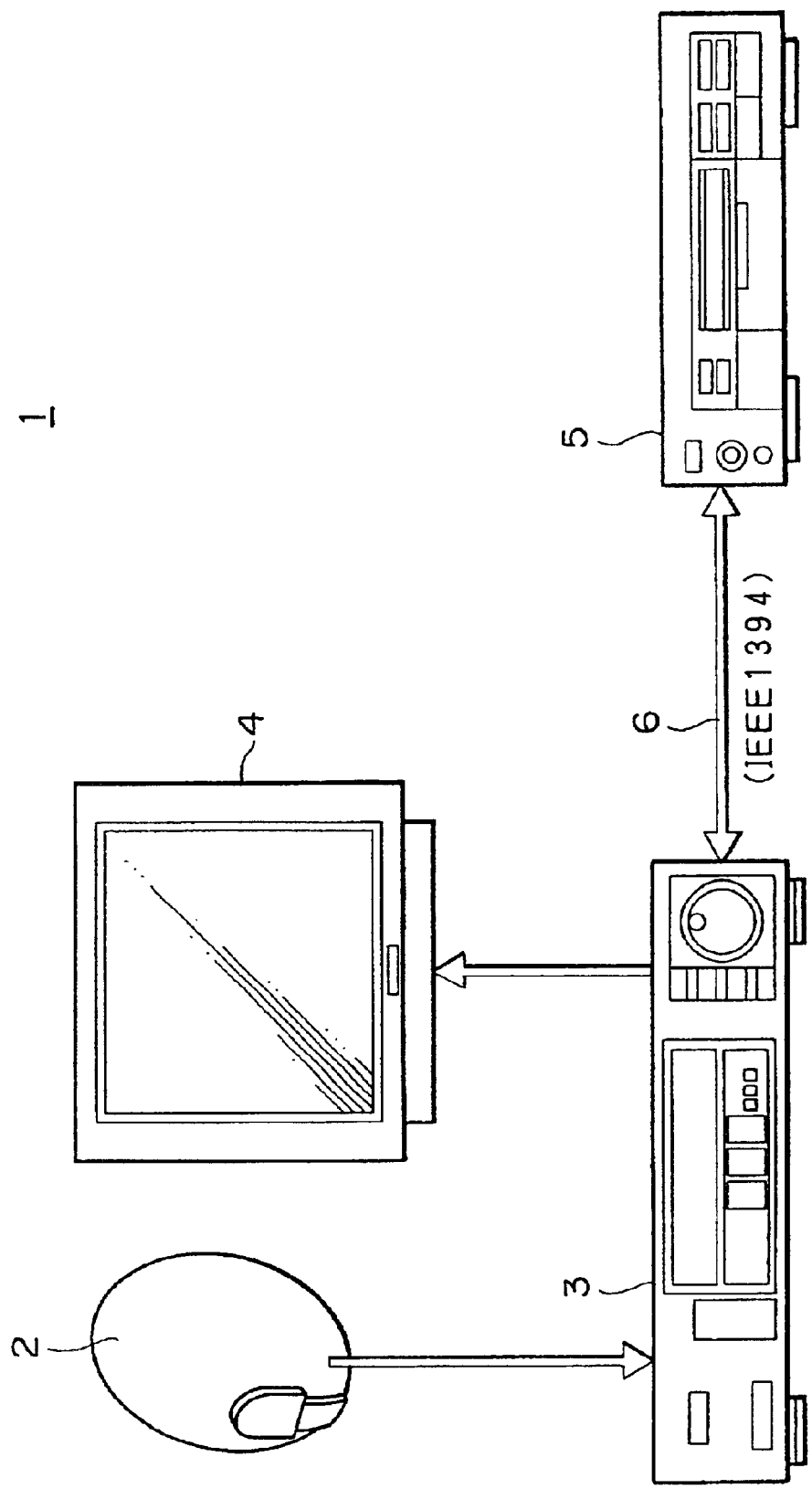
FIG. 1 is a schematic diagram illustrating an image printing apparatus practiced as one preferred embodiment of the invention.

Now, referring to FIG. 1, there is shown a system configuration of an image printing apparatus practiced as one preferred embodiment of the invention. A program guide printing apparatus 1 comprises an antenna 2 for receiving moving images which are broadcast via a satellite communication, an STB 3 for executing predetermined signal processing on the received moving images, a television receiver 4 for displaying the processed moving images and still images, and a printer 5 connected to the STB 3 with an i.LINK 6.

The antenna 2 outputs a received video signal to the STB 3. The video signal received by the antenna 2 is a superimposition of the video signals of multiple channels, in which moving image data are compressed by the MPEG (Moving Picture Experts Group) standard and encrypted by a predetermined encryption scheme.

The television receiver 4 receives the moving image data compliant with the NTSC (National Television System Committee) standard from the STB 3 to display the received moving images.

The STB 3 becomes a controller and a source device at the time of printing, thereby controlling the printer 5 to print the moving images.

The printer 5 receives various kinds of print information, arranges the layout of them, executes raster imaging on them, and prints the resultant information. The printer 5 also functions a sync device on printing.

The i.LINK 6 denotes the IEEE 1394 standard, which interconnects the components of the embodiment.

Figure 2:
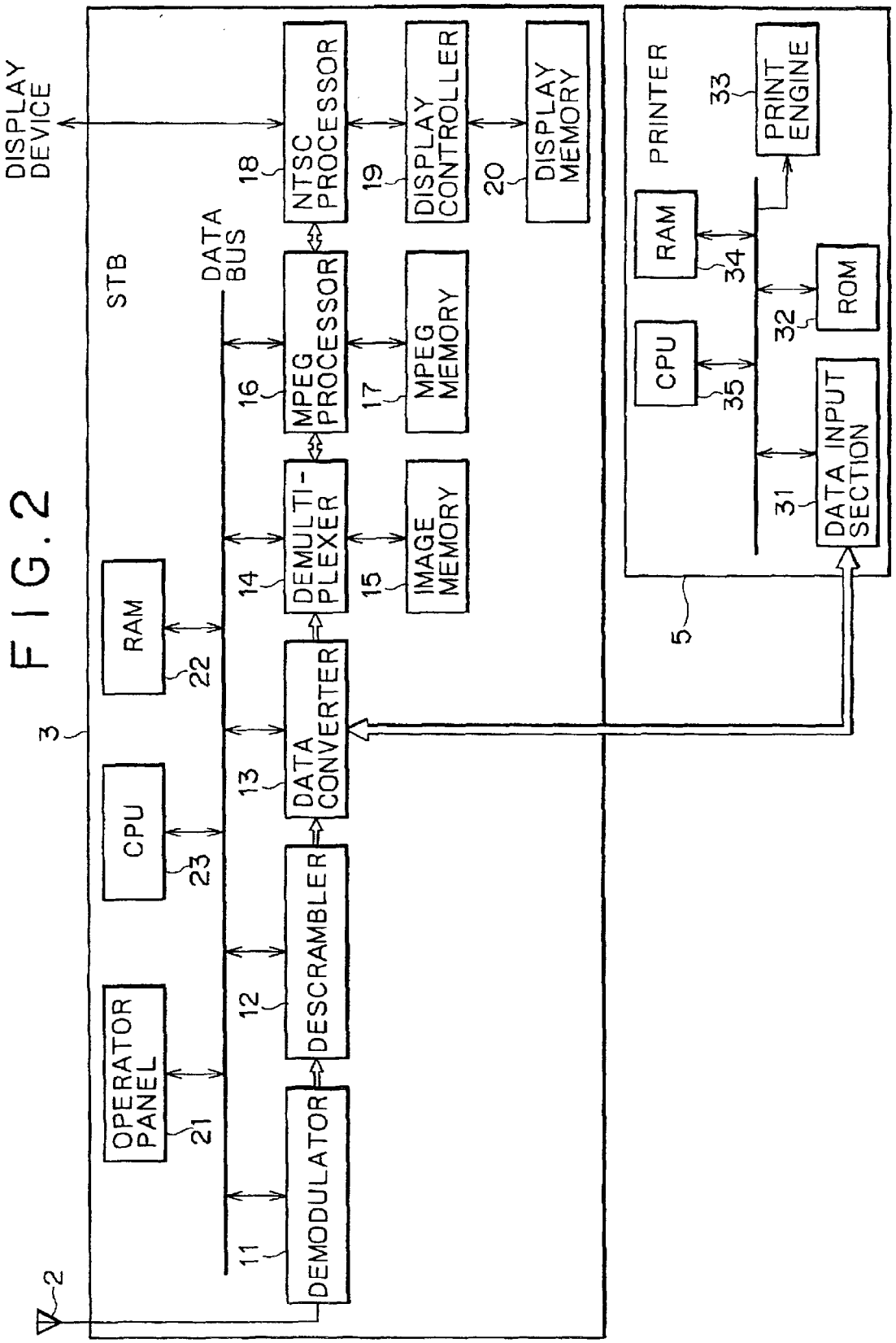
FIG. 2 is a block diagram illustrating an STB and a printer of the image printing apparatus of FIG 1.

Referring to FIG. 2, there is shown an internal configurations of the STB 3 and the printer 5.

As shown in FIG. 2, the STB 3 has a demodulator 11 for demodulating a signal received at the antenna 2, a descrambler 12 for decrypting the encrypted moving image data, a data converter 13 for executing the data conversion processing compliant with the IEEE 1394 standard on the decrypted data, a demultiplexer 14 for extracting the moving image data in a predetermined channel, an image memory 15, an MPEG processor 16 for decoding the moving image data, an MPEG memory 17, an NTSC processor 18 for converting the data into those which can be displayed on the television receiver 4, a display controller 19, a display memory 20, an operator panel 21 from which user instructions are inputted, a RAM 22, and a CPU 23 for controlling the above-mentioned functional blocks.

In the STB 3, the demodulator 11, the descrambler 12, the data converter 13, the demultiplexer 14, the MPEG processor 16, the operator panel 21, the RAM 22, and the CPU 23 are interconnected by a data bus. Through the data bus, the CPU 23 controls these components.

The demodulator 11 receives, from the antenna 2, an analog video signal indicative of a moving image stream for example. The demodulator 11 demodulates the received video signal, converts the demodulated video signal from analog to digital, and outputs the resultant digital moving image data to the descrambler 12. The demodulator 11 also receives control signals from the CPU 23 via the data bus. On the basis of these control signals, the demodulator 11 executes the demodulation processing and A/D conversion.

The descrambler 12 decrypts the moving image data supplied from the demodulator 11. Namely, the encrypted moving image data are inputted in the descrambler 12, which decrypts the inputted data in accordance with the encryption scheme by which the data are encrypted. Then, the descrambler 12 outputs the decrypted moving image data to the data converter 13. The descrambler receives a control signal from the CPU 23 via the data bus and executes the decryption processing by use of the encryption key information contained in this control signal.

The data converter 13 is constituted by an interface circuit compliant with the IEEE 1394 standard for example. In accordance with a control signal supplied from the CPU 23, the data converter 13 executes the signal processing compliant with the IEEE 1394 standard on the moving image data supplied from the descrambler 12, putting the inputted moving image data or still image data into packets compliant with the IEEE 1394 standard. At this moment, the data converter 13 adds an overhead, which is predetermined control information, to the moving image data or still image data, thereby generating packets. In outputting the still image data to the printer 5, the data converter 13 follows asynchronous arbitration. Namely, when outputting the still image data to the printer 5, the data converter 13 outputs the packets containing the still image data in accordance with a response by the printer 5.

To be more specific, the data converter 13 executes the processing in the transaction layer, the link layer, and the physical layer under the control of the serial bus compliant with the IEEE 1394 standard. Consequently, under the control of the CPU 23, the data converter 13 sets the connection with the printer 5 and generates packets containing the still image data and the overhead, outputting the generated packets to the printer 5 connected in compliance with the IEEE 1394 standard.

When displaying the data received by the STB 3 on the television receiver 4 without executing the processing compliant with the IEEE 1394 standard, the data converter 13 outputs the moving image data supplied from the descrambler 12 to the demultiplexer 14 under the control of the CPU 23.

The demultiplexer 14 executes channel selection processing in which a channel set by the CPU 23 is selected from the plural channels superimposed on the moving image data supplied from the data converter 13, outputting only the moving image data indicative of the selected channel to the MPEG processor 16.

Under the control of the CPU 23, the demultiplexer 14 also receives the still image data consisting of luminance information and color difference information from the MPEG processor 16 and stores the received still image data in the image memory 15, outputting the stored still image data to the data converter 13 under the control of the CPU 23.

On the basis of the control signal supplied from the CPU 23, the MPEG processor 16 decodes, in compliance with the MPEG standard, the moving image data supplied from the demultiplexer 14, outputting the decoded moving image data to the NTSC processor 18 as decompressed moving image data. Consequently, the MPEG processor 16 converts each frame constituting the moving image into an image (YCC image) consisting of luminance information (Y) and color difference information (Cr, Cb). In doing so, the MPEG processor 16 uses the MPEG memory 17 as a work area in which the MPEG processor 16 stores the plural moving image data on a frame basis to be decoded.

On the basis of the control signal indicative of compression ratio supplied from the CPU 23, the MPEG processor 16 encodes, in compliance with the MPEG standard, the moving image data supplied from the NTSC processor 18, thereby compressing the moving image data in temporal and spatial directions and outputting the compressed moving image data to the demultiplexer 14. In doing so, the MPEG processor 16 stores, into the MPEG memory 17, plural moving image data on a frame basis to be encoded.

The NTSC processor 18 encodes the moving image data supplied from the MPEG processor 16 into the NTSC moving image data which can be displayed on the television receiver 4 and outputs the encoded moving image data thereto.

The display controller 19 executes the processing for displaying the NTSC moving image data supplied from the NTSC processor 18 onto the television receiver 4. In doing so, the display controller 19 stores the data to be processed into the display memory 20.

To be more specific, in accordance with the television receiver 4, the display controller 19 controls such that the frame-based data constituting the moving image data are converted into a display size suitable for display on the television receiver 4, for example, 720 pixels×480 pixels for the NTSC standard or 1920 pixels ×1080 pixels for the HD (High Definition) standard. When generating one pixel of data, the display controller 19 sets the ratio of luminance signal Y, color difference signal Cr and color difference signal Cb to 4 to 2 to 2, thereby generating 16-bit information.

The operator panel 21, arranged on the STB 3 for example, generates operation input signals in response to user's operating controls arranged on the operator panel 21, outputting the generated operation input signals to the CPU 23. To be more specific, the operator panel 21 generates the operation input signals for holding a moving image displayed by the user on the television receiver 4 and printing this moving image by the printer 5 as a still image.

The CPU 23 generates the control signals for controlling the above-mentioned components of the STB 3 on the basis of operation input signals supplied from the operator panel 21, for example.

When displaying a video signal received at the antenna 21 onto the television receiver 4 for example, the CPU 23 outputs control signals to the demodulator 11, the descrambler 12, the data converter 13, the demultiplexer 14, and the MPEG processor 16 to have these components execute demodulation, decryption, channel selection, and MPEG-compliant decoding on the moving image data.

When a frame-based still image in the moving image displayed on the television receiver 4 is displayed by an operation input signal supplied from the operator panel 21, the CPU 23 generates a control signal for reading the frame-based still image from the display memory 20 into the image memory 15 at the time when the operation input signal is inputted.

In addition, when an operation input signal comes telling that the image for which the still image data are generated is to be printed by printer 5, the CPU 23 controls the demultiplexer 14 and the data converter 13 so as to output the frame-based data stored in the image memory 15, which are a YCC image consisting of luminance information and color difference information, to the printer 5 via the data converter 13, which is an interface circuit compliant with the IEEE 1394 standard.

The printer 5 comprises a data input section 31 for inputting still image data from the STB 3, a ROM (Read Only Memory) 32 storing a print control program, a print engine 33 for actually printing the data, a RAM 34, and a CPU 35 for controlling these component as shown in FIG. 2.

The data input section 31, constituted by an interface circuit compliant with the IEEE 1394 standard for example, executes signal processing compliant with the IEEE 1394 standard on the still image data inputted as a packet from the STB 3, in accordance with the control signal supplied from the CPU 35.

To be more specific, the data input section 31 executes the processing in the transaction layer, the link layer, and the physical layer under the control of the serial bus compliant with the IEEE 1394 standard. Consequently, the data input section 31 outputs the still image data as a packet to the CPU 35.

Moreover, the data input section 31 sets a connection for the transfer of packets between the printer 5 and the data converter 13 of the STB 3 when the printer 5 is mechanically connected to the STB 3 with an optical cable for example.

The print engine 33 is composed of a print medium holding facility, a printer header, and a printer head driver for example and prints still images on print medium under the control of the CPU 35.

The CPU 35 generates the control signals for controlling the data input section 31 and the print engine 33. At this moment, the CPU 35 operates as instructed by the print control program stored in the ROM 32 and controls the contents of the RAM 34 as a work area of the CPU 35.

The present invention is the printing apparatus thus constituted, in which an electronic program guide (EPG) received by the STB 3 is filtered by channel and time zone, the filtered EPG is stored in the form of a table for example, and the stored EPG is sent to the printer to be printed. The following describes a method of printing an electronic program guide (EPG) with reference to FIG. 3.

Figure 3:
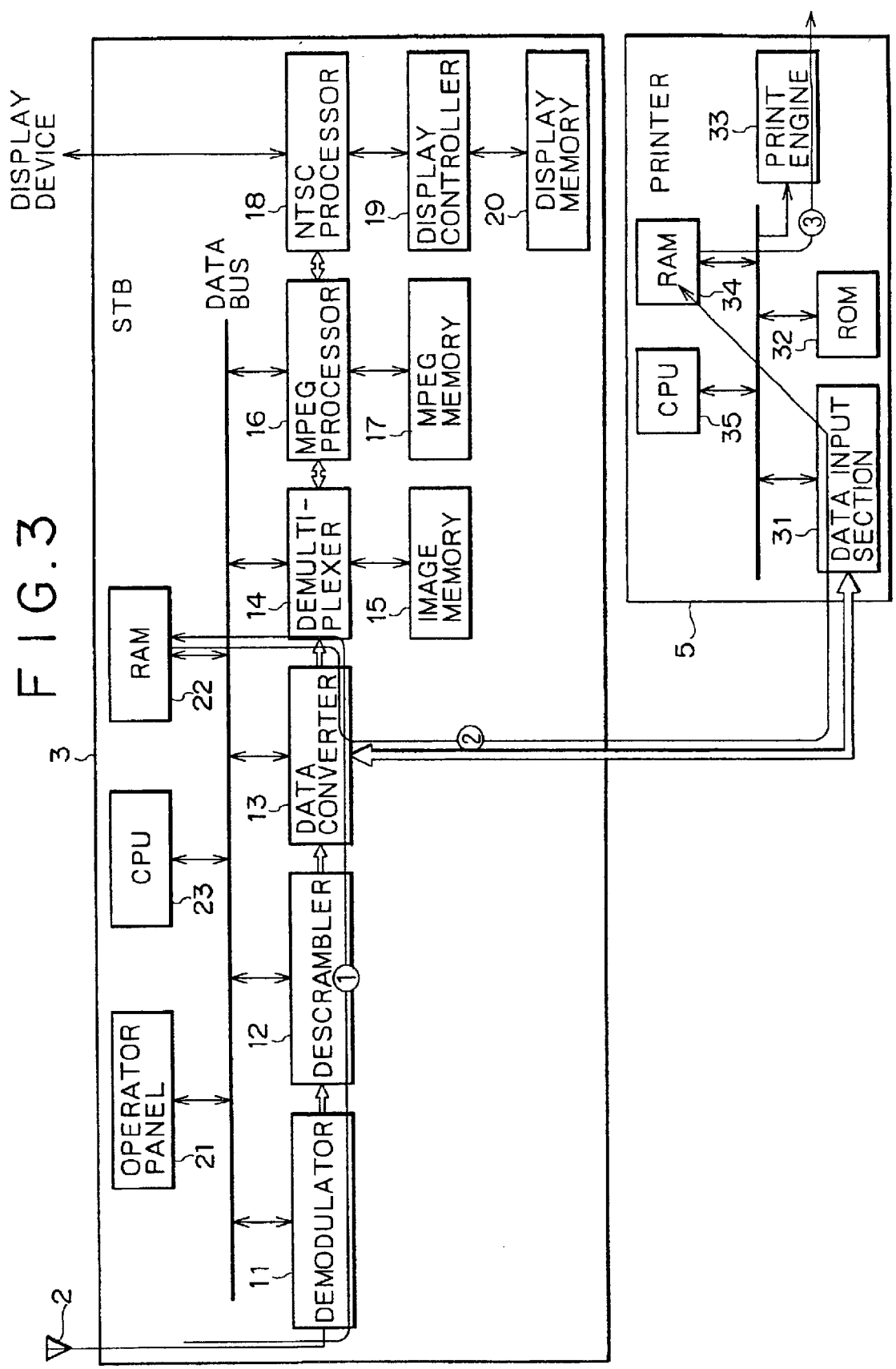
FIG. 3 is a block diagram for describing a process of printing an electronic program guide (EPG) by the image printing apparatus of FIG. 1.

First, as denoted by ① in FIG. 3, the STB 3 receives an EPG via the antenna 2. The received signal is demodulated and converted from analog to digital by the demodulator 11, decrypted by the descrambler 12, and signal-processed by the data converter 13. In the received signal, the EPG data are multiplexed as one data stream along with other video and audio information.

The processed signal is then demultiplexed by the demultiplexer 14 as denoted by ② in FIG. 3 to extract only the EPG stream, which is filtered to extract a specified channel (a service number) and broadcast start time (a segment) for example. The extracted data are stored in the RAM 22.

Next, as denoted by ③ in FIG. 3, the EPG data are converted in the form of a table for example to be sent to the printer 5 via the bus compliant with the IEEE 1394 standard.

The printer 5 executes layout, character rasterization, and color separation on the received EPG data and prints the resultant EPG data by the print engine 33 in accordance with the print control program, under control of the CPU 35.

Figure 4:
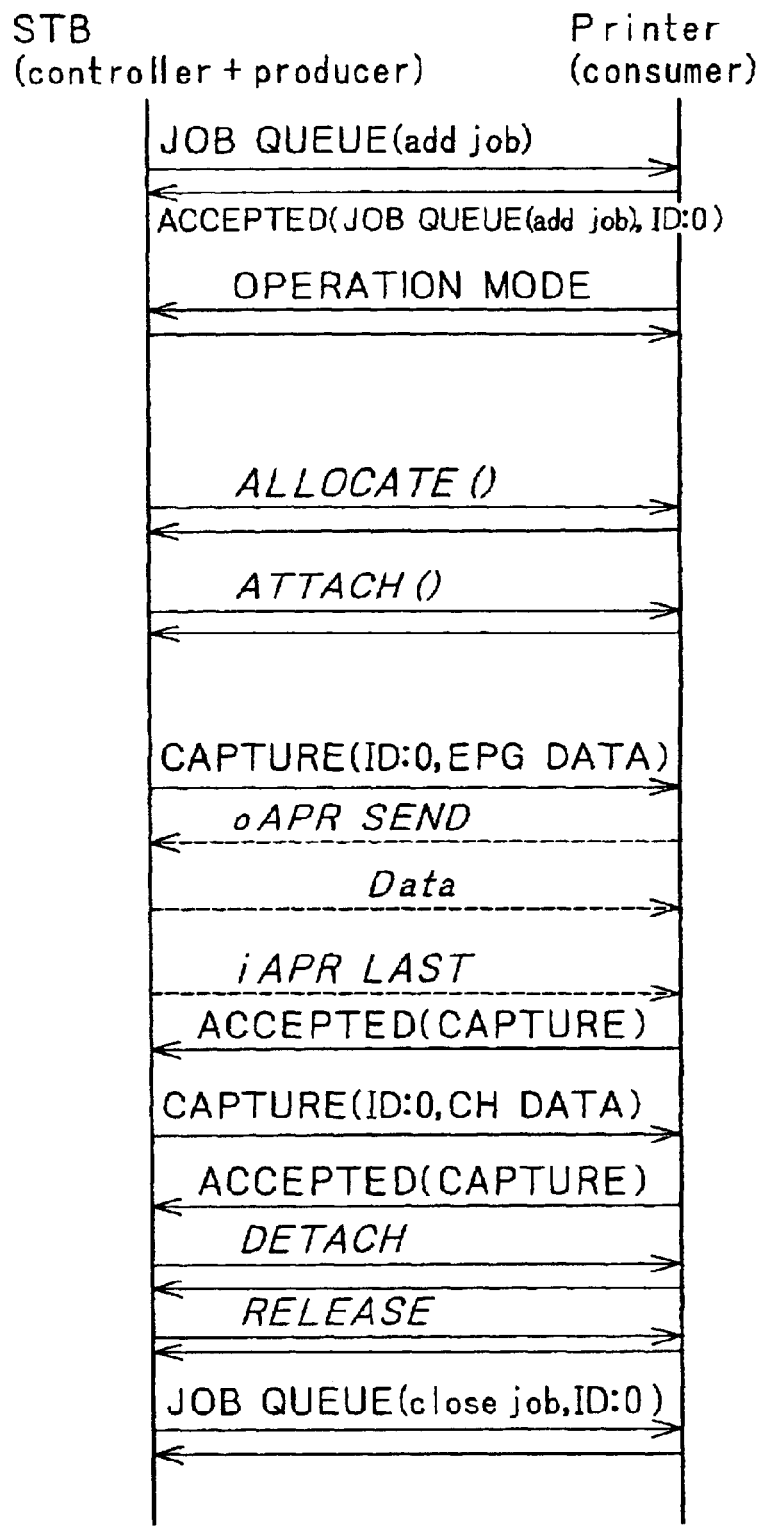
FIG. 4 is a diagram illustrating a command sequence between the STB and the printer.

Referring to FIG. 4, there is shown a command sequence to be executed between the STB 3 and the printer 5 when the EPG data are transmitted from the STB 3 to the printer 5. First, a print job is generated by a JOB QUEUE (add job). This forms one unit of printing. Next, the number of EPG divisions for transmission and the print direction are specified by an OPERATION MODE. Then, asynchronous plug is established by an ALLOCATE/ATTACH, this asynchronous plug providing EPG data transmission virtual path.

A send plug number and a send size are specified by a CAPTURE and the printer 5 is instructed to send the EPG data from the STB 3. In the actual data transmission, the EPG data are sent between oAPR SEND and iAPR LAST in the following asynchronous plug.

When the above-mentioned sequence has been completed, the printer 5 returns a response (ACCEPTED) to the STB 3 telling the acceptance of the CAPTURE. In the same manner, channel data are transmitted.

Next, the asynchronous plug is disconnected by a DETACH/RELEASE. Finally, the end of transmission of all data is notified by a JOB QUEUE (close job).

In response, the printer 5 starts printing, executing EPG data and CH data layout, character scaling and rasterization, and color conversion, and printing the resultant data on paper for example.

Figure 5:
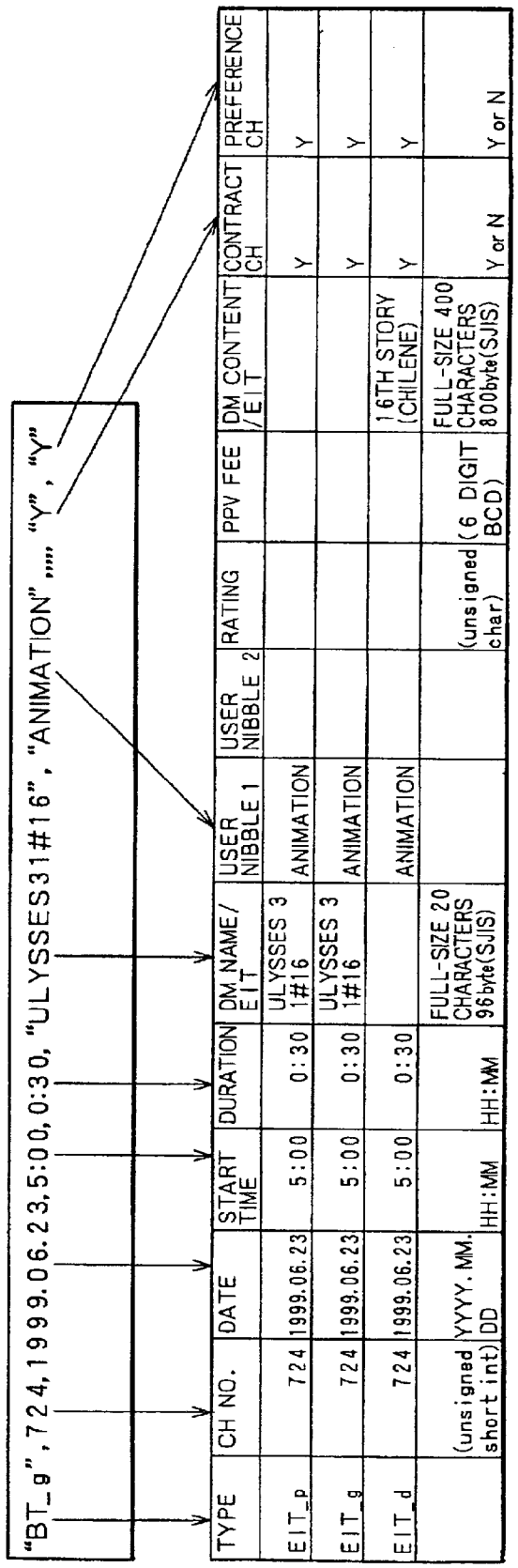
FIG. 5 is a diagram illustrating a format of EPG data.

Referring to FIG. 5, there is shown a format of the EPG data transmitted by the asynchronous plug connection.

These EPG data are of a CSV (Comma Separated Value) form. In CSV, each character string is enclosed by double quotations ("), the end of each line is denoted by CR (0×0d), and all data items are aligned.

In FIG. 5, "Type" denotes the type of source, "EIT p" denotes a current program table, "EIT g" denotes weekly program table General, and "EIT d" denotes weekly program table Detail.

"CH number" denotes a select channel number (service id).

"Date" denotes current date, hour, and minute, which are computed from+table id/section number.

"Start time" and "duration" denote the program start time and duration.

"DM name/EIT" denotes a program name in 20 full-size characters (96 char).

"User nibble 1" and "user nibble 2" denote program genres.

"Rating" denotes the viewing restriction imposed to person under age, represented by 4 to 20.

"PPV fee" denotes the fee of pay program in a range of 0 to 999999 (yen).

"DM content/EIT" denotes the contents of the program in full-size 400 characters (800 char).

"Contract CH" and "Preference CH" denote the correspondence with previously registered contract channel or preference channel in "Y" (Yes) or "N" (No).

Referring to FIG. 6, there is shown a format of the CH data to be transmitted by the asynchronous plug connection. The CH data is a label notation unique to that channel, which is represented in a binary form and includes information associated with one channel.

In FIG. 6, "service number" denotes a channel number (service id).

"Service name", within 18 fill-size characters (40 char), denotes a service (station) name (DM name/SDT).

"Logo type", "logo color", and "logo bit map" denote the contents of logo notation. "Logo type" is represented by 0×01 (horizontal 48 dots, vertical 24 dots), 0×02 (horizontal 72 dots, vertical 36 dots). "Logo color" is represented by luminance Y, color differences Cb and Cr. Logo color y0 denote "0"-dot Y, Cb, and Cr levels in logo bit map.

"Logo bit map", 324 bytes long, denotes a bit map (1 bit/pixel) with logos arranged from the upper left and on in lines, the MSB being at the left end.

Figure 7:
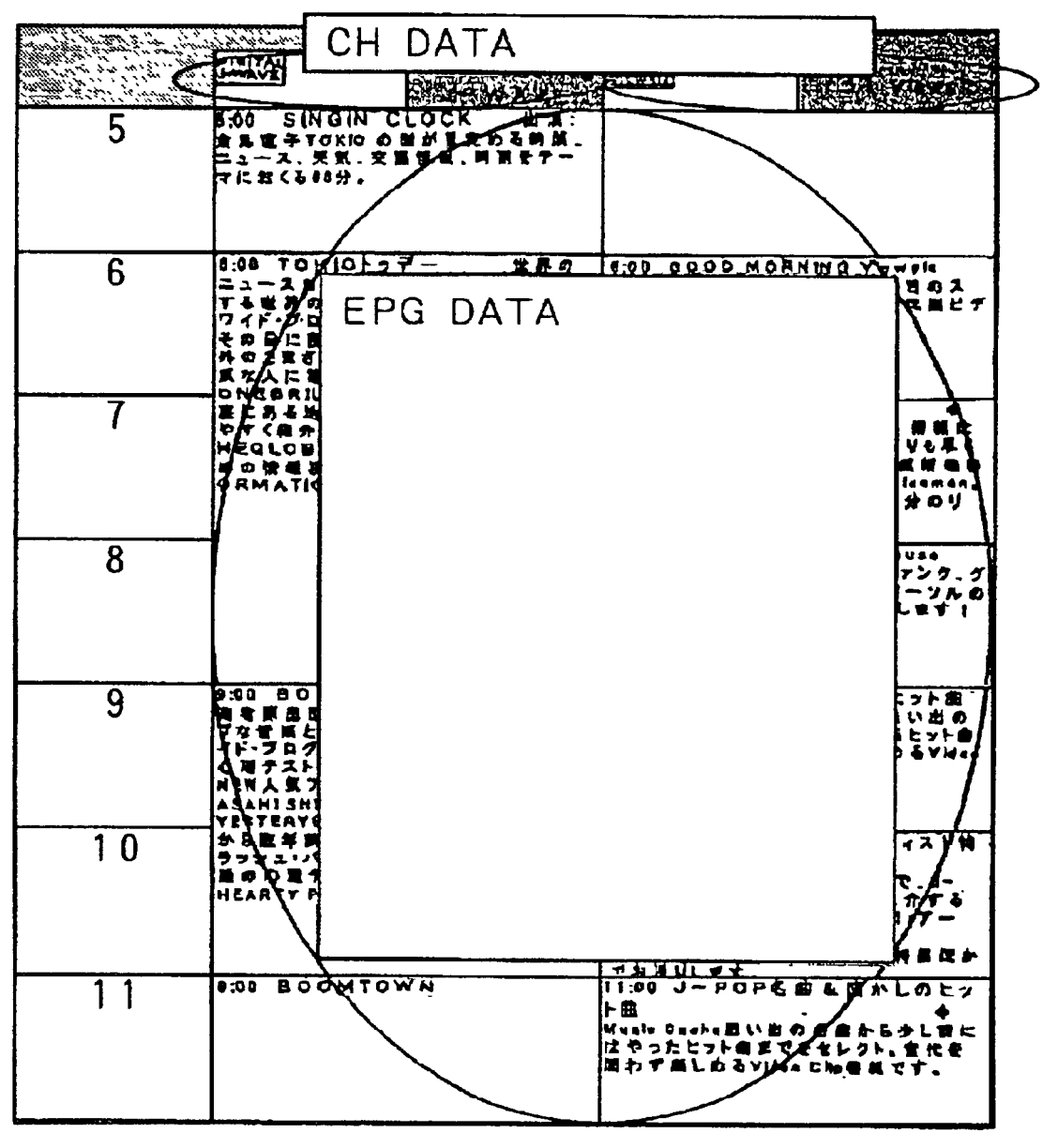

Referring to FIG. 7, there is shown one example of a print with EPG data and CH data laid out. In this example, the horizontal axis represents channel and the vertical axis represents time. In the upper portion, data for two channels are horizontally shown. A program guide from 5:00 a.m. to 11:00 a.m. is printed all over.

As described and according to the invention, the image printing apparatus recited in claim 1 appended hereto, for printing character data information of an electronic program guide added to externally inputted image information, comprises: an information processor comprising: demodulating/decoding means for detecting and demodulating/decoding the character data information of the electronic program guide added to the externally inputted image information; storage means for storing the demodulated/decoded character data information of the electronic program guide by the demodulating/decoding means; and output means for including the character data information of the electronic program guide stored by the storage means into a packet compliant with the IEEE 1394 standard and outputting the packet to the printer, and a printer comprising: input means for inputting the character data information of the electronic program guide included in the packet compliant with the IEEE 1394 standard outputted from the output means; print control means for detecting print control information from the character data information of the electronic program guide supplied from the input means; and printing means for printing the character data information of the electronic program guide under the control of the print control means.

Consequently, the externally supplied image information and character data such as program guides can be printed with a resolution good enough for easily reading the printed characters without especially arranging vector fonts and a buffer memory for storing them.

The image printing apparatus recited in claim 2 appended hereto, wherein the output means and the input means constitute an interface circuit which is compliant with the IEEE 1394 standard.

Consequently, the components of the apparatus can be interconnected by the IEEE 1394 interface, thereby simplifying the configuration of the apparatus.

The image printing apparatus recited in claim 3, wherein the information processor comprises receiving means for receiving broadcast waves including image information.

Consequently, the character data such as a program guide received by the STB can be printed with a resolution good enough for easily reading the printed characters without especially arranging vector fonts and a buffer memory for storing them.

While the preferred embodiments of the present invention have been described using specific terms, such description is for illustrative purposes only, and it is to be understood that changes and variations may be made without departing from the spirit or scope of the appended claims.

What is claimed is:

1. An image printing apparatus for printing character data information of an electronic program guide added to externally inputted image information, comprising;

an information processor comprising:
   demodulating/decoding means for detecting and demodulating/decoding said character data information of the electronic program guide added to said externally inputted image information;
   storage means for storing the demodulated/decoded character data information of the electronic program guide by said demodulating/decoding means; and
   output means for including the character data information of the electronic program guide stored by said storage means into a packet compliant with the IEEE 1394 standard and outputting said packet to said printer independent of a vector font, and a printer comprising:
   input means for inputting the character data information of the electronic program guide included in said packet compliant with the IEEE 1394 standard outputted from said output means;
   print control means for detecting print control information from the character data information of the electronic program guide supplied from said input means; and
   printing means for printing the character data information of the electronic program guide under the control of said print control means.

2. The image printing apparatus according to claim 1, wherein said output means and said input means constitute an interface circuit which is compliant with the IEEE 1394 standard.

3. The image printing apparatus according to claim 1, wherein said information processor comprises receiving means for receiving broadcast waves including age information.

* * * * *